United States Patent
Boul et al.

(10) Patent No.: US 11,560,509 B2
(45) Date of Patent: Jan. 24, 2023

(54) REVERSIBLE MECHANICALLY TRIGGERED NANOSILICA GELS

(71) Applicant: Saudi Arabian Oil Company, Dhahran (SA)

(72) Inventors: Peter Boul, Houston, TX (US); Abeer Mohammad Al-Olayan, Dammam (SA); Diana Rasner, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/951,795

(22) Filed: Nov. 18, 2020

(65) Prior Publication Data
US 2022/0154065 A1     May 19, 2022

(51) Int. Cl.
*C09K 8/516*     (2006.01)
*E21B 21/00*     (2006.01)

(52) U.S. Cl.
CPC ............ *C09K 8/516* (2013.01); *E21B 21/003* (2013.01)

(58) Field of Classification Search
CPC .. C09K 8/05; C09K 8/14; C09K 8/516; E21B 21/003
See application file for complete search history.

(56) References Cited

U.S. PATENT DOCUMENTS

| | | | |
|---|---|---|---|
| 6,586,371 B1 | 6/2003 | Maroy et al. | |
| 2010/0071893 A1 | 3/2010 | Caritey et al. | |
| 2018/0134945 A1 | 5/2018 | Al-Olayan et al. | |
| 2019/0292435 A1* | 9/2019 | Goodman | ............ C07D 403/14 |

FOREIGN PATENT DOCUMENTS

| | | |
|---|---|---|
| CN | 103160265 A | 6/2013 |
| WO | 2014020061 A1 | 2/2014 |
| WO | 2018178266 A1 | 10/2018 |

OTHER PUBLICATIONS

Kawasaki, et al., "Affirmation of the effect of pH on shake-gel and shear thickening of a mixed suspension of polyethylene oxide and silica nanoparticles," Colloids and Surfaces A 537, 2018, pp. 236-242.
Malkin, et al., "The rheological state of suspensions in varying the surface area of nano-silica particles and molecular weight of the poly(ethylene oxide) matrix," Colloid Polym Sci, 295, 2017, pp. 555-563.
Ramos-Tejada, et al., "Shaken but not stirred: The formation of reversible particle—polymer gels under shear," Colloids and Surfaces A: Physicochemical and Engineering Aspects 471, 2015, pp. 164-169.
International Search Report and Written Opinion for International Application No. PCT/US2021/059289 (SA5954), report dated Mar. 15, 2022; pp. 1-18.
Kamibayashi, Masashi et al.; "Shear-thickening flow of nanoparticle suspensions flocculated by polymer bridging" Journal of Colloid and Interface Science 321 (2008) pp. 294-301.
Liu, S.F. et al.; "General phase and rheological behavior of silica/peo/water systems" Colloids and Surfaces A: Physiochemical and Engineering Aspects 111 (1996) pp. 139-145.

* cited by examiner

*Primary Examiner* — Aiqun Li
(74) *Attorney, Agent, or Firm* — Bracewell LLP; Constance G. Rhebergen; Eleanor L. Tyson

(57) ABSTRACT

A reversible gel composition including nanosilica and polyethylene oxide, the nanosilica and polyethylene oxide present at concentrations operable to allow for the reversible gel composition to be a flowable liquid at pH greater than about 8 and operable to allow for the reversible gel composition to be a substantially solid gel at pH less than about 8.

11 Claims, 3 Drawing Sheets

REVERSIBLE MECHANICALLY TRIGGERED NANOSILICA GELS

BACKGROUND

Field

Embodiments of the disclosure relate to compositions including nanosilica and polyethylene oxide, along with methods for making and using such compositions. In particular, the disclosure relates to reversible gel compositions including nanosilica and polyethylene oxide which are mechanically responsive to shear and pH variation, in combination with certain salts such as aluminum chloride, for use in oil and gas applications.

Description of the Related Art

In processes related to the drilling of and production from oil, gas, and water wells, large material losses may occur due to cracks and vugs in rock formations being drilled. Large material losses lead to costly inefficiencies in drilling processes directly impacting the rate of penetration (ROP). Material losses are not limited to drilling fluids in the process of well construction, but also include product loss, which can lead to loss of a well. To mitigate these losses, lost circulation materials (LCMs) are often used in well drilling and production processes.

LCMs are also useful in remediating problems associated with well blowouts and channeling. Surface blowouts occur when a drill bit opens a high pressure pocket of oil, gas, or water which blows out drilling mud, and sometimes drilling equipment, resulting in their loss or destruction. Channeling occurs when fluid in one formation flows through continuous passages in cement behind well casing into another formation at a different well depth. In these cases, LCM fluid introduction into the well is necessary to terminate the unwanted flow and seal the undesired channels.

Presently, shear thickening fluids are limited to compositions and systems that typically do not change their propensity to thicken or gel in the presence of shear forces. Also lacking are systems and compositions which can reversibly shear thicken or gel in response to shear forces.

SUMMARY

The disclosure presents compositions including nanosilica and polyethylene oxide, along with methods for making and using such compositions. Nanosilica can be grafted with polymers for application in oil and gas related industries. Compositions of the present disclosure applied in oil and gas drilling and production systems and methods, for example, can reduce coagulation of materials in suspension and act as useful reversible gels for a variety of applications in well drilling, well cementing, maintaining well integrity, and enhanced oil recovery (EOR).

In certain compositions, polyethylene oxide, polyacrylic acid, and one or more nanosilica fluids beneficially and synergistically interact to form reversible shake gel systems. Optionally, aluminum chloride can be included in such systems. Flowable liquid to gel compositions of the present disclosure are fully reversible between a flowable liquid and a solid gel as pH in addition to or alternative to composition components are altered.

Example compositions described here provide methods and systems for remote controlled chemistry allowing downhole changes from flowable liquids to solid gels through the introduction of chemical triggers at the command of an operator, or in response to a stimulus proximate a wellbore or hydrocarbon-bearing formation. For example, in response to loss of materials during drilling or production, for example loss of a drilling mud from a wellbore to a formation, flowable liquids of the present disclosure can be triggered to become a solid gel by a change in chemistry, such as a change in pH or addition of one or more chemicals to the wellbore without a change in pH. With the change in pH or addition of one or more chemicals to the wellbore, the responsiveness of exemplary compositions to mechanical shear changes, becoming more or less sensitive, where in some instances mechanical shear causes gelling.

To introduce stimulus-responsive rheology and mechanical responsivity to well construction liquids, specialized nanosilica-polymer composites are designed with specialized shear responsive rheology. Example nanosilica liquids of the present disclosure use a specialized nanosilica at least in part incorporating a string of pearls morphology. The use of a nanosilica liquid at least partially incorporating a string of pearls morphology with a polyethylene oxide (PEO) composition leads to a mechanically responsive composition. When this composition is sheared at the appropriate shear rate, it transforms into a substantially solid gel, suitable to prevent fluid loss from a wellbore, for example as a solid barrier. The gel relaxes in time to a flowable liquid in the absence of shear, or alternatively does not relax in time to a flowable liquid in the absence of shear until an additional chemical stimulus is added or until a condition such as temperature or pressure is changed proximate the solid gel.

Liquid-to-gel mechanically responsive compositions and systems can be transitioned to a solid or substantially solid gel and re-transitioned back to a flowable liquid by a change in pH. Changing pH of a flowable liquid in some embodiments of the present disclosure can render the liquid insensitive or sensitive to shear forces. In other words, shear will not effect a change of a flowable liquid to a substantially solid or solid gel at certain values of pH. Insensitivity to shear, however, is reversible, and a solid or substantially solid gel can be made to revert to a flowable liquid with a change in pH, and subsequently a reversion back to an original pH can then be used to change the composition or system such that it is mechanically responsive again and produces a gel in response to shear. Similar reversibility can be triggered by addition of other components, without a change in pH.

When drilling in a zone in a hydrocarbon-bearing formation that incurs formation losses, fluids comprising compositions described here can be applied as a lost circulation material (LCM). When example LCMs are placed in the wellbore, the shear imparted on the liquid as it passes through the cracks and fractures in the rock formation converts the liquid into a gel and reduces apertures of the fractures and blocks the passage of further fluids out of a wellbore into the formation. Example LCMs of the disclosure can be activated to a solid or substantially solid gel or deactivated to a flowable liquid with a change in pH, for example, or with the addition of one or more chemicals without a change in pH.

Other applications of compositions of the present disclosure include use as cementing additives to provide substantially instantaneous solid gel structure following a shear event, or use in spacer, completion, or workover fluids. Such a property is of particular benefit in remedial cementing where injection rates for squeeze jobs can be used to control the mechanical properties of the gel to resist pore pressure in a formation, thereby preventing gas migration, for example. In addition, example compositions can be applied in EOR to increase water viscosity to avoid fingering, as the fluid forms solid gel structure, which may enhance oil and gas extraction when sheared through the permeable sections in formations and sands.

In one embodiment, a cement composition containing polyethylene oxide and nanosilica displays shear thickening behavior needed to resist pore-pressure in the process of well remediation while also shortening the cement set-time. Cement setting, accelerated by nanosilica, reduces the risk of failure of a remedial cementing job by reducing the time of low mechanical strength of the material during time-critical remedial operations.

In one embodiment, water containing polyethylene oxide and nanosilica can have rheological properties of the fluid further modified with addition of a component such as aluminum chloride, and such a fluid can be used for EOR where shear dependent control of viscosity is useful for extracting oil from source rocks. In some embodiments of the present disclosure, in situ gels are not returned to a sol state or liquid state by the properties of a reservoir or wellbore such as temperature, pressure, pH, or salt concentration. Instead, gels of the present disclosure can be instructively converted to a sol state or a liquid state, for example for removal from a wellbore or reservoir, by addition of a chemical stimulus. In some embodiments, pH can be a trigger for reversible gel formation and gel dissolution; however, in other embodiments the use of salts such as sodium chloride and aluminum chloride can be used as triggers or chemical stimulus to convert between a gel and a sol or liquid state, and these salts function independent of pH.

Therefore, disclosed here is a reversible gel composition including nanosilica and polyethylene oxide, the nanosilica and polyethylene oxide present at concentrations operable to allow for the reversible gel composition to be a flowable liquid at pH greater than about 8 and operable to allow for the reversible gel composition to be a substantially solid gel at pH less than about 8. In some embodiments, the nanosilica comprises a nanosilica colloidal liquid. In other embodiments, a change in the pH of the reversible gel composition or the addition of a chemical component affects the capacity of the reversible gel composition to gel in response to shear. In some embodiments, the polyethylene oxide is between about 200,000 and about 400,000 viscosity average molecular weight ($M_v$). In certain embodiments of the composition, an acid is included. Still in further embodiments, the acid comprises hydrochloric acid. In certain embodiments, the composition includes a base.

In some embodiments, the base comprises potassium hydroxide. In other embodiments, the composition includes a component selected from the group consisting of: aluminum chloride hexahydrate; sodium chloride; and mixtures thereof. Still in other embodiments, the polyethylene oxide is present at between about 0.025% by weight and about 0.50% by weight of the nanosilica colloidal liquid. Still in other embodiments, the composition includes poly(acrylic acid). The poly(acrylic acid) can be present at between about 0.025% by weight and about 0.10% by weight of the reversible gel composition.

Further disclosed here is a method for reducing fluid loss proximate a wellbore in a hydrocarbon-bearing reservoir, the method comprising the steps of: introducing into the wellbore a reversible gel composition in a flowing liquid state, the reversible gel composition suitable to flow to and within apertures from which fluid is being lost; and reducing the pH of the reversible gel composition to transition the reversible gel composition from the flowing liquid state to an at least substantially solid state operable to reduce fluid flow causing lost circulation. Some embodiments of the method include effecting a change in the reversible gel composition once the reversible gel composition is within the apertures in the at least substantially solid state to reverse the reversible gel composition to the flowing liquid state, the change selected from the group consisting of: raising the pH of the reversible gel composition; adding aluminum chloride hexahydrate to the reversible gel composition, optionally without a pH change; adding sodium chloride to the reversible gel composition, optionally without a pH change; adding poly (acrylic acid) to the reversible gel composition; and combinations thereof.

In some embodiments of the method, the reversible gel composition comprises a nanosilica colloidal liquid. In other embodiments, the reversible gel composition comprises polyethylene oxide between about 200,000 and about 400,000 viscosity average molecular weight ($M_v$). Still in other embodiments, the polyethylene oxide is present at between about 0.025% by weight and about 0.50% by weight of nanosilica colloidal liquid. Some embodiments include the step of reducing the pH of the reversible gel composition, including the use of hydrochloric acid. Still in other embodiments of the method, included is the step of raising the pH of the reversible gel composition, where the step of raising the pH of the reversible gel composition includes the use of potassium hydroxide. Other embodiments include the step of adding poly(acrylic acid) to the reversible gel composition, where the poly(acrylic acid) is present at between about 0.025% by weight and about 0.10% by weight of the reversible gel composition. In both compositions and methods disclosed here, the responsive fluids and gels can be repeatedly altered between a flowable state and a non-flowable state, for example one, twice, thrice, or more.

In some embodiments of the methods, a step of reducing the pH of the reversible gel composition reduces the pH to between about 8.5 and 9 to allow the reversible gel composition to gel in response to shear proximate the wellbore, and a step of effecting a change in the reversible gel composition includes raising the pH of the reversible gel composition to above about pH 9. In some other embodiments, the step of reducing the pH of the reversible gel composition reduces the pH to less than about 7 to allow the reversible gel composition to form a solid gel without shear, and the step of effecting a change in the reversible gel composition includes raising the pH of the reversible gel composition to above about pH 8.5. Still in some embodiments of the composition, a pH between about 8.5 and 9 allows the reversible gel composition to gel in response to shear.

In some embodiments of the method, the step of reducing the pH of the reversible gel composition comprises a first step of reducing the pH from above pH 9 to between pH 8.5 and 9, followed by a second step of reducing the pH from between pH 8.5 and 9 to less than pH 8.5.

Additionally disclosed is a method for reducing fluid loss proximate a wellbore in a hydrocarbon-bearing reservoir, the method including introducing into the wellbore a reversible gel composition in a flowing liquid state, the reversible gel composition suitable to flow to and within apertures from which fluid is being lost; and applying a mechanical shear force to the reversible gel composition to transition the reversible gel composition from the flowing liquid state to an at least substantially solid state, wherein the properties of the wellbore and hydrocarbon-bearing reservoir do not return the reversible gel composition from the at least substantially solid state to the flowing liquid state. Mechanical shear force can be applied or changed via changes to flow rate and pressure during injection of a drilling fluid comprising the reversible gel composition.

Some embodiments include effecting a change in the reversible gel composition once the reversible gel composition is within the apertures in the at least substantially solid state, the substantially solid state suitable to prevent fluid losses from a wellbore, to reverse the reversible gel composition to the flowing liquid state, the change selected from the group consisting of: raising the pH of the reversible gel composition; adding aluminum chloride hexahydrate to the reversible gel composition; adding sodium chloride to the reversible gel composition; adding poly(acrylic acid) to the reversible gel composition; and combinations thereof.

In some embodiments, the reversible gel composition comprises a nanosilica colloidal liquid. In other embodiments, the reversible gel composition comprises polyethylene oxide between about 20,000 and about 1,000,000 viscosity average molecular weight (Mv). Still in other embodiments, the reversible gel composition comprises polyethylene oxide between about 200,000 and about 400,000 viscosity average molecular weight (Mv). In certain embodiments, the polyethylene oxide is present at between about 0.025% by weight and about 0.50% by weight of nanosilica colloidal liquid. Still in other embodiments, the method includes the step of raising the pH of the reversible gel composition, where the step of raising the pH of the reversible gel composition includes the use of potassium hydroxide. Some embodiments include the step of adding poly(acrylic acid) to the reversible gel composition, where the poly(acrylic acid) is present at between about 0.025% by weight and about 0.10% by weight of the reversible gel composition.

Certain other embodiments include the step of adding aluminum chloride hexahydrate to the reversible gel composition, wherein the step does not change the pH of the gel or surrounding environment. Still other embodiments include the step of adding sodium chloride to the reversible gel composition, wherein the step does not change the pH of the gel or surrounding environment. Other embodiments include the step of reducing the pH of the reversible gel composition to between about 8.5 and 9 to allow the reversible gel composition to gel in response to shear proximate the wellbore, and the step of effecting a change in the reversible gel composition includes raising the pH of the reversible gel composition to above about pH 9.

In some embodiments, the step of reducing the pH of the reversible gel composition comprises a first step of reducing the pH from above pH 9 to between pH 8.5 and 9, followed by a second step of reducing the pH from between pH 8.5 and 9 to less than pH 8.5. Still other embodiments include the step of re-transitioning the reversible gel composition from the flowing liquid state to the at least substantially solid state after the step of effecting the change.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

So that the manner in which the features and advantages of the embodiments of compositions including nanosilica and polyethylene oxide, along with methods for making and using such compositions, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

EXAMPLES

In example embodiments of the present disclosure, differing concentrations of Sigma Aldrich polyethylene oxide 100% (PEO) polymer compositions of both about 200,000 and about 400,000 viscosity average molecular weight ($M_v$) were combined and mixed with Nissan Chemicals America Corporation ST-PS-M nanosilica colloidal liquid to observe shear thickening effects. Weighed amounts of PEO and nanosilica liquid as received were gently stirred under ambient conditions with a magnetic stir bar and plate until the PEO was fully dissolved in the nanosilica liquid.

Concentrations of PEO in the nanosilica colloidal fluid varied from about 0.01% or about 0.025% to about 0.50% PEO by weight, and the mixtures were tested both visually by shaking and through rheology studies using an Anton Paar Viscometer in Osc-Rot-Osc mode. This mode is required for the three-interval shear thickening test described here for the Examples. The first interval of the test measures the elastic and viscous moduli of the PEO/nanosilica fluid system through oscillation at 1 Hz frequency and 1% amplitude in a standard cup and bob measuring system. The second interval applies stress to the system in the form of a large shear rate at 3,000 $s^{-1}$ for 1 minute. Immediately following, the third interval repeats the 1 Hz frequency and 1% amplitude oscillation measurement to show the changes in the elastic and viscous moduli, indicating a physical change from a flowable liquid system before applied stress to a solid gel-like system afterward.

Figure 1A:
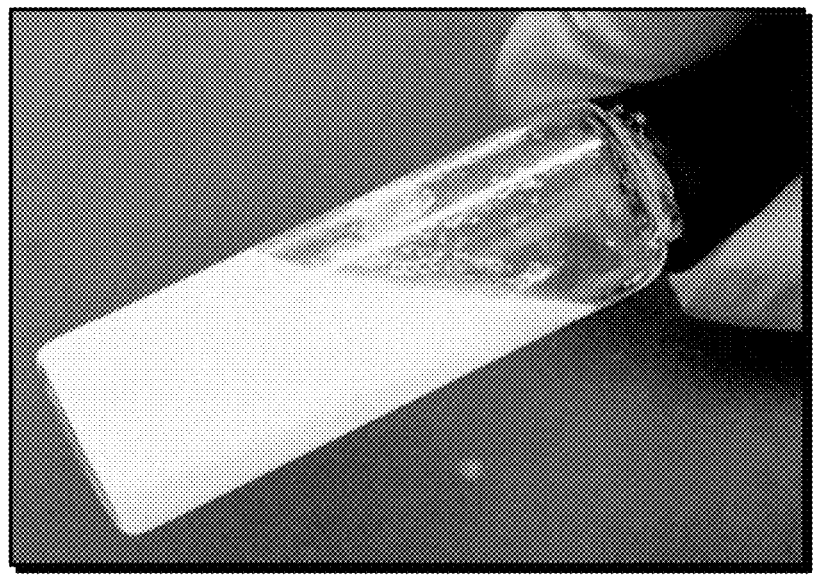
FIG. 1A is a pictorial representation of a nanosilica/PEO flowable liquid composition before shaking with PEO at about 0.05% weight concentration.
Figure 1B:
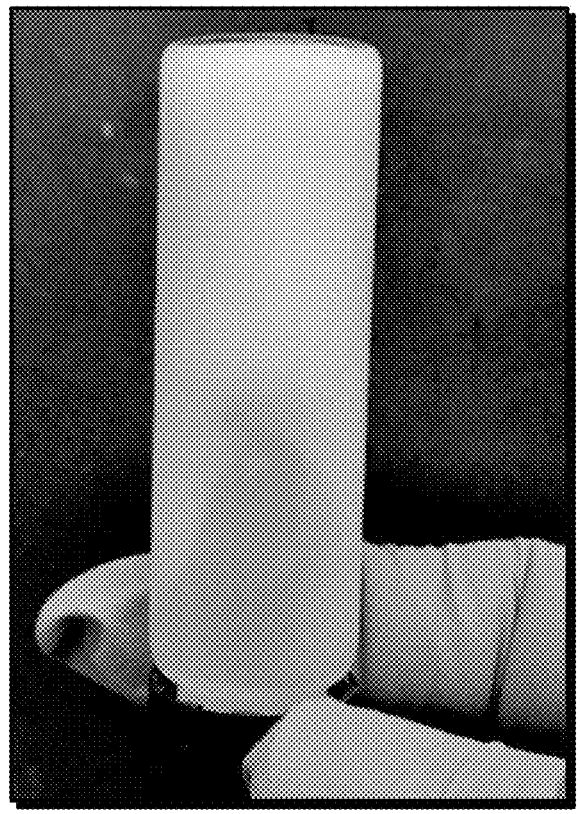
FIG. 1B is a pictorial representation of the gelling nanosilica/PEO composition after shaking with PEO at about 0.05% weight concentration.
Figure 2:
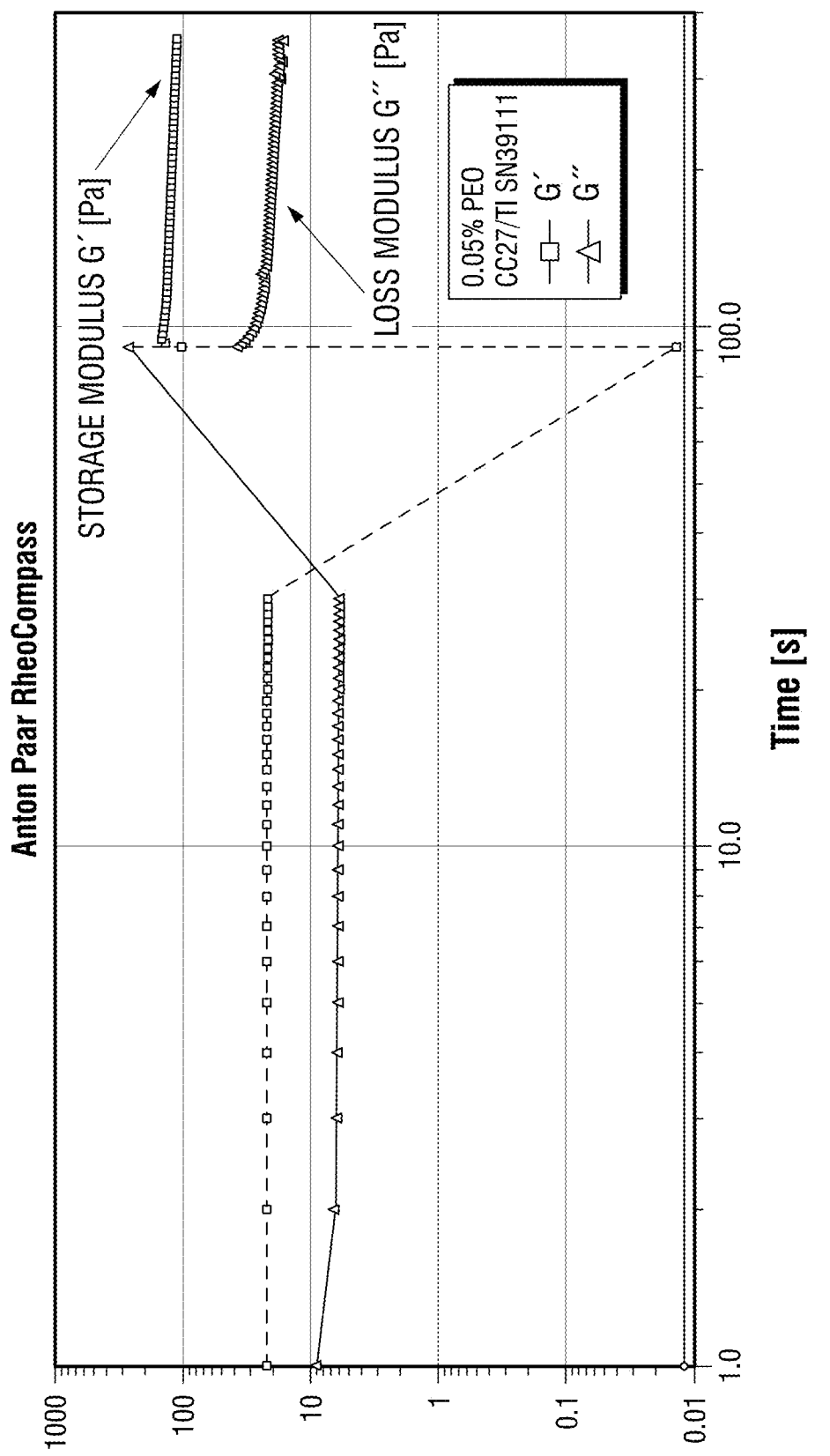
FIG. 2 is a graph showing an increase in storage modulus and loss modulus for a PEO/nanosilica composition of the present disclosure measured using an Anton Paar Rheometer with Osc-Rot-Osc mode.
Figure 3:
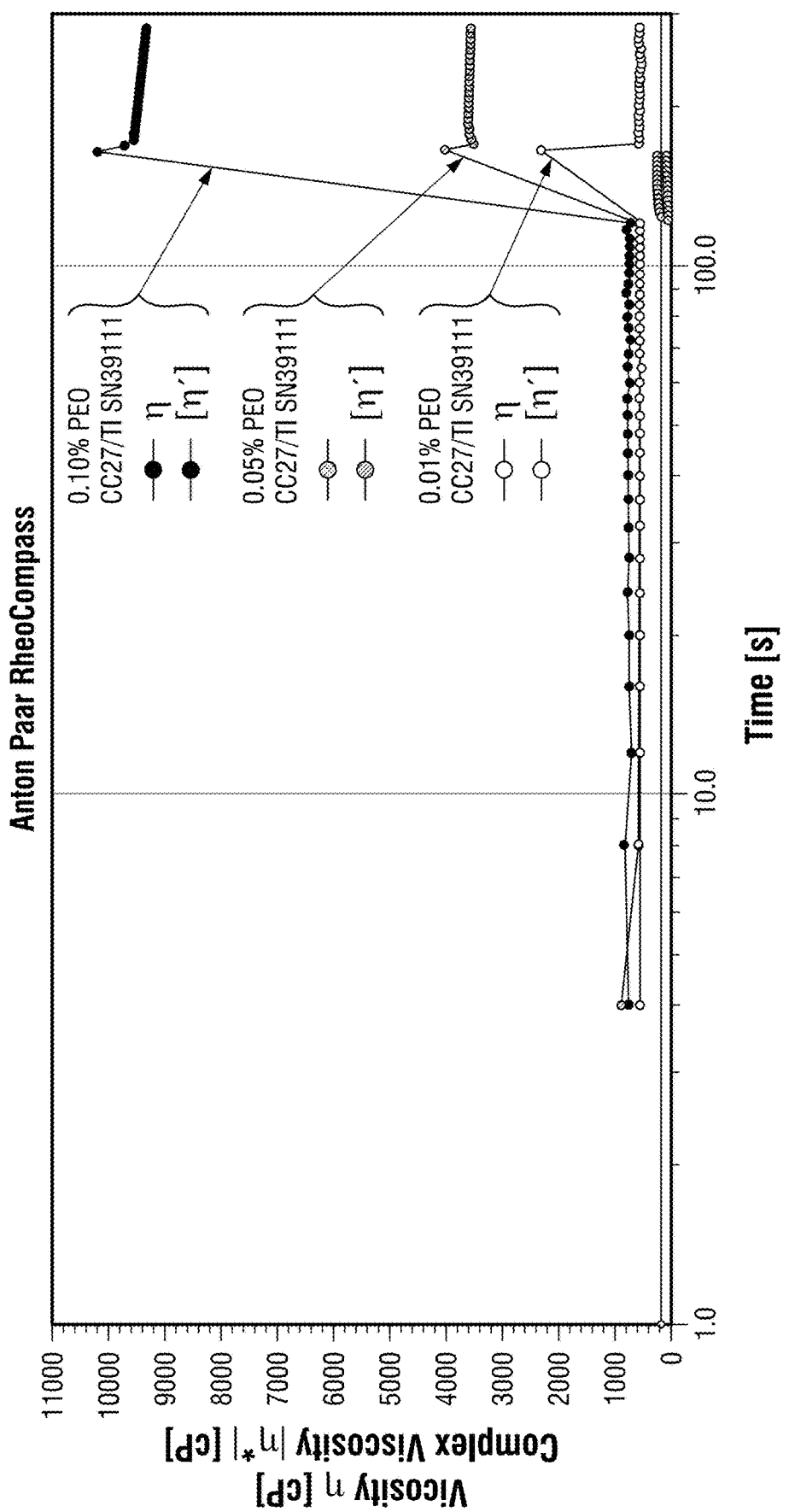
FIG. 3 is a graph showing viscosity increasing using increasing weight percentages of PEO in nanosilica fluid.

For example, FIG. 1A is a pictorial representation of a nanosilica/PEO liquid composition before shaking with PEO at about 0.05% weight concentration. FIG. 1B is a pictorial representation of the gelling nanosilica/PEO composition after shaking with PEO at about 0.05% weight concentration. FIG. 1B shows solid gelling taking place within a few seconds within the composition. FIG. 2 is a graph showing an increase in storage modulus and loss modulus for a PEO/nanosilica composition of the present disclosure measured using an Anton Paar Rheometer with Osc-Rot-Osc mode. FIG. 3 is a graph showing viscosity increasing using increasing weight percentages of PEO in nanosilica fluid.

Based on certain experiments, PEO of $M_v$ of about 200,000 generally requires more weight percentage in nanosilica colloidal liquid to observe visible shear thickening compared to PEO of $M_v$ of about 400,000. This result suggests that the molecular size and weight of the polymer being used has at least some effect on the polymer's interaction with the nanosilica colloidal liquid. At weight percentages greater than about 0.25%, in both the 200,000 $M_v$ and 400,000 $M_v$ PEO, shear thickening of the flowable liquid occurs rapidly in minutes or seconds after shaking or shearing, and relaxation of the solid gel back to its original flowable liquid state takes more than 1 day. In an application in a wellbore environment, therefore, adapted compositions could remain in a gel state for at least a day or longer as a lost circulation material before being returned to a flowable fluid, either or both by properties of the wellbore or formation proximate the gel/stimulus additions to the wellbore or formation.

Addition of 0.05% by weight of Sigma Aldrich poly (acrylic acid) (PAA) with a $M_v$ of about 450,000 to an about 0.05% PEO by weight PEO-nanosilica liquid quickened the relaxation time of the gel to fluid by about half of the original time required, while maintaining shear thickening properties. In other words, with the addition of PAA, example solid and substantially solid gels return to a flowable liquid fluid state faster in the absence of mechanical shear, allowing for adjustability in relaxation time by varying the concentrations of PEO/PAA/nanosilica colloidal liquid systems.

In both PEO/nanosilica colloidal liquid and PEO/PAA/nanosilica colloidal liquid compositions, pH adjustment of the flowable liquid resulted in reversible or switchable gel systems. The addition of acid or base can switch on or off the capacity of the material to gel or the capacity of the material to gel in response to mechanical agitation or shear. For example, initial pH of flowable liquid mixtures was between about 8.0 to about 9.5. For a 1.0 gram sample of 0.05% PEO by weight PEO-nanosilica liquid composition, 0.1 g addition of concentrated hydrochloric acid (HCl) reduced the pH to less than about pH 3 and resulted in a much quicker flocculation to a stiff, stable solid gel when stress via shaking was applied. Subsequent addition of base, potassium hydroxide (KOH), at 0.1 g to the flocculated, stiff, solid gel brought the system back to a flowable system that could still be turned to gel with enough applied stress/shear. Other acids, including strong acids, and bases, such as alkali and alkaline-earth metal bases can be used in addition to or alternative to PAA, HCl, and KOH. A solid or substantially solid state of the gels described herein can prevent flow of other liquids across the gel.

However an additional amount of 0.1 g KOH forced the pH over the original system pH of about 8.5 to 9 and created a flowable liquid where applied stress would show no visible gelation at all. The system could then turn be reversed with subsequent additions of acid to form a gel state with or without applied stress. Nitric, phosphoric, and acetic acid are also readily interchangeable for acid use in embodiments of the present disclosure. Calcium hydroxide and sodium hydroxide also are suitable as bases.

Dilution of the original PEO/PAA/nanosilica colloidal liquid occurs with each addition of acid and base, which appears to reduce the interaction between the original starting materials to a point where no shear thickening will occur and a reversible system is lost, after for example multiple chemical additions. For a 400,000 $M_v$ PEO system, the limit occurs when the weight percentage of PEO in the system hits about 0.025% PEO by weight or less of total fluid including colloidal silica along with additions of acid and base.

In certain experiments, a 10% by weight addition of either Sigma Aldrich aluminum chloride hexahydrate or BDH Chemicals sodium chloride to a stable gel system of PEO/nanosilica colloid reverts the solid gel back into a flowable liquid state, without substantially changing the pH. However, once such additional chemicals are incorporated into the system, shear thickening properties are decreased. At a 20% by weight addition, shear thickening properties are completely lost.

Although the disclosure has been described with respect to certain features, it should be understood that the features and embodiments of the features can be combined with other features and embodiments of those features.

Although the disclosure has been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise.

As used throughout the disclosure and in the appended claims, the words "comprise," "has," and "include" and all grammatical variations thereof are each intended to have an open, non-limiting meaning that does not exclude additional elements or steps. The term "about" when used with respect to a value or range refers to values including plus and minus 5% of the given value or range.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

While the disclosure has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present disclosure may suitably comprise, consist or consist essentially of the elements disclosed and may be practiced in the absence of an element not disclosed.

The invention claimed is:

1. A method for reducing fluid loss proximate a wellbore in a hydrocarbon-bearing reservoir, the method comprising the steps of:
   introducing into the wellbore a reversible gel composition in a flowing liquid state, the reversible gel composition suitable to flow to and within apertures from which fluid is being lost;
   reducing the pH of the reversible gel composition to transition the reversible gel composition from the flowing liquid state to an at least substantially solid state, wherein the properties of the wellbore and hydrocarbon-bearing reservoir do not return the reversible gel composition from the at least substantially solid state to the flowing liquid state;

effecting a change in the reversible gel composition once the reversible gel composition is within the apertures in the at least substantially solid state to reverse the reversible gel composition to the flowing liquid state, the change selected from the group consisting of: raising the pH of the reversible gel composition; adding aluminum chloride hexahydrate to the reversible gel composition; adding sodium chloride to the reversible gel composition; adding poly(acrylic acid) to the reversible gel composition; and combinations thereof, where the reversible gel composition consists of a nanosilica colloidal liquid and polyethylene oxide between about 20,000 and about 1,000,000 viscosity average molecular weight ($M_v$), where the polyethylene oxide is present at between about 0.025% by weight and about 0.50% by weight of nanosilica colloidal liquid.

2. The method according to claim 1, where the polyethylene oxide of the reversible gel composition is between about 200,000 and about 400,000 viscosity average molecular weight ($M_v$).

3. The method according to claim 1, where the step of reducing the pH of the reversible gel composition includes the use of hydrochloric acid.

4. The method according to claim 1, including the step of raising the pH of the reversible gel composition, where the step of raising the pH of the reversible gel composition includes the use of potassium hydroxide.

5. The method according to claim 1, including the step of adding poly(acrylic acid) to the reversible gel composition, where the poly(acrylic acid) is present at between about 0.025% by weight and about 0.10% by weight of the reversible gel composition.

6. The method according to claim 1, including the step of adding aluminum chloride hexahydrate to the reversible gel composition, wherein the step does not substantially change the pH of the gel or surrounding environment by more than about 10% of an original pH value.

7. The method according to claim 1, including the step of adding sodium chloride to the reversible gel composition, wherein the step does not substantially change the pH of the gel or surrounding environment by more than about 10% of an original pH value.

8. The method according to claim 1, wherein the step of reducing the pH of the reversible gel composition reduces the pH to between about 8.5 and 9 to allow the reversible gel composition to gel in response to shear proximate the wellbore, and wherein the step of effecting a change in the reversible gel composition includes raising the pH of the reversible gel composition to above about pH 9.

9. The method according to claim 1, wherein the step of reducing the pH of the reversible gel composition reduces the pH to less than about 7 to allow the reversible gel composition to form a solid gel without shear, and wherein the step of effecting a change in the reversible gel composition includes raising the pH of the reversible gel composition to above about pH 8.5.

10. The method according to claim 1, wherein the step of reducing the pH of the reversible gel composition comprises a first step of reducing the pH from above pH 9 to between pH 8.5 and 9, followed by a second step of reducing the pH from between pH 8.5 and 9 to less than pH 8.5.

11. The method of claim 1, further comprising the step of re-transitioning the reversible gel composition from the flowing liquid state to the at least substantially solid state after the step of effecting the change.

* * * * *